(12) United States Patent
Capizzo

(10) Patent No.: US 9,873,408 B2
(45) Date of Patent: Jan. 23, 2018

(54) DEVICE FOR REFUELING, EXCHANGING, AND CHARGING POWER SOURCES ON REMOTE CONTROLLED VEHICLES, UAVS, DRONES, OR ANY TYPE OF ROBOTIC VEHICLE OR MACHINE WITH MOBILITY

(71) Applicant: Peter D. Capizzo, Madison, AL (US)

(72) Inventor: Peter D. Capizzo, Madison, AL (US)

( * ) Notice: Subject to any disclaimer, the term of this patent is extended or adjusted under 35 U.S.C. 154(b) by 79 days.

(21) Appl. No.: 15/194,526

(22) Filed: Jun. 27, 2016

(65) Prior Publication Data

US 2017/0327091 A1 Nov. 16, 2017

Related U.S. Application Data

(60) Provisional application No. 62/334,689, filed on May 11, 2016.

(51) Int. Cl.
*B60S 5/02* (2006.01)
*B67D 7/04* (2010.01)
(Continued)

(52) U.S. Cl.
CPC ............. *B60S 5/02* (2013.01); *B60L 11/1816* (2013.01); *B60L 11/1822* (2013.01); *B60S 5/06* (2013.01);
(Continued)

(58) Field of Classification Search
CPC ............. B60L 11/1816; B60L 11/1822; B60L 2200/10; B60L 2200/32; B60S 5/02;
(Continued)

(56) References Cited

U.S. PATENT DOCUMENTS 7,966,945 B1 * 6/2011 Miller ................... B61C 7/04
105/35
8,006,793 B2 * 8/2011 Heichal ................. B60K 1/04
180/65.1
(Continued)

*Primary Examiner* — Timothy L Maust
*Assistant Examiner* — Andrew Schmid

(57) ABSTRACT

An Automatic Service Station Facility (ASSF) for replenishing various motivational energy sources onboard different types of AUV, Drones, and Remotely Controlled (RC) or robotic vehicles is disclosed herein. In one embodiment, the automatic service station facility includes a rack, replaceable fuel tanks, a service module, and an electronic computer control system. The replaceable fuel tanks are stocked on the rack and substantially filled with various fluids which are utile as motivational energy sources within fuel-operated vehicles. The service module is mounted on the rack, and the electronic computer control system is connected in electrical communication with the service module. In this configuration, the service module is controllably operable to receive a depleted replaceable fuel tank from a fuel-operated vehicle and also selectively deliver one of the filled replaceable fuel tanks onboard the vehicle. In another embodiment, the service station facility may also stock replaceable batteries for selective delivery onboard battery-operated vehicles. In another embodiment, the ASSF is self-propelled, remotely controlled, and solar powered, being able to move long distances to remote locations which may be hazardous to humans, such as disaster zones or battle fields, where the ASSF can service AUV, Drones, and Remotely Controlled (RC) or robotic vehicles needed for the particular applications. Alternatively, the solar powered ASSF can be made to move continuously and service vehicles continuously for long duration operations like herding cattle for example.

30 Claims, 7 Drawing Sheets

(51) Int. Cl.
| | |
|---|---|
| *B60S 5/06* | (2006.01) |
| *B60L 11/18* | (2006.01) |
| *G05D 1/00* | (2006.01) |
| *G05D 1/12* | (2006.01) |
| *F17C 1/12* | (2006.01) |
| *H01M 10/0525* | (2010.01) |
| *H01M 10/34* | (2006.01) |
| *H01M 10/32* | (2006.01) |
| *H01M 10/30* | (2006.01) |
| *H01M 10/06* | (2006.01) |
| *C25B 1/04* | (2006.01) |
| *C25B 9/06* | (2006.01) |
| *H02J 7/00* | (2006.01) |

(52) U.S. Cl.
CPC .............. *B67D 7/0401* (2013.01); *C25B 1/04* (2013.01); *C25B 9/06* (2013.01); *F17C 1/12* (2013.01); *G05D 1/0011* (2013.01); *G05D 1/12* (2013.01); *H01M 10/0525* (2013.01); *H01M 10/06* (2013.01); *H01M 10/30* (2013.01); *H01M 10/32* (2013.01); *H01M 10/345* (2013.01); *H02J 7/0013* (2013.01); *B60L 2200/10* (2013.01); *B60L 2200/32* (2013.01); *H01M 2220/20* (2013.01)

(58) Field of Classification Search
CPC  B60S 5/06; B67D 7/0401; C25B 1/04; C25B 9/06; F17C 1/12; G05D 1/0011; G05D 1/12; H01M 10/0525; H01M 10/06; H01M 10/30; H01M 10/32; H01M 10/345; H01M 2220/20; H02J 7/0013
USPC ......................................................... 141/103
See application file for complete search history.

(56) References Cited

U.S. PATENT DOCUMENTS

| | | | | |
|---|---|---|---|---|
| 8,035,341 | B2* | 10/2011 | Genzel | B60L 11/1818 180/65.1 |
| 8,118,147 | B2* | 2/2012 | Ori | B60L 11/1824 191/12.2 A |
| 8,246,376 | B2* | 8/2012 | Amit | B60L 11/005 439/456 |
| 8,454,377 | B2* | 6/2013 | Heichal | B60K 1/04 180/65.1 |
| 8,862,288 | B2* | 10/2014 | Vavrina | B60L 11/1822 320/109 |
| 8,899,903 | B1* | 12/2014 | Saad | B65G 67/00 320/109 |
| 8,957,626 | B2* | 2/2015 | Lombarte | B60K 1/04 29/729 |
| 9,162,653 | B2* | 10/2015 | Escande | B60K 1/04 |
| 9,169,114 | B2* | 10/2015 | Butler, Jr. | B67D 7/0401 |
| 9,310,024 | B2* | 4/2016 | Plummer | F17C 13/003 |
| 9,428,154 | B2* | 8/2016 | Mulato | B60L 11/1822 |
| 9,701,284 | B2* | 7/2017 | Poillot | B60K 1/04 |
| 9,776,601 | B2* | 10/2017 | Bercovici | B60S 5/06 |
| 2007/0113921 | A1* | 5/2007 | Capizzo | B60K 15/063 141/231 |
| 2008/0061477 | A1* | 3/2008 | Capizzo | H01J 9/025 264/402 |

* cited by examiner

DEVICE FOR REFUELING, EXCHANGING, AND CHARGING POWER SOURCES ON REMOTE CONTROLLED VEHICLES, UAVS, DRONES, OR ANY TYPE OF ROBOTIC VEHICLE OR MACHINE WITH MOBILITY

FIELD OF THE INVENTION

The present invention generally relates to radio controlled vehicles, or any type of mobile vehicle, model, or machine that is Remotely Controlled (RC) or has robotic or autonomous mobility. More particularly, the present invention relates to the hobby industry RC models, planes, cars, boats, etc., but can include industrial, commercial, and military applications where the power source becomes depleted over time, including solid, liquid, or gaseous fuels and/or batteries of any type. Such elements as mobile robots or stock/inventory transporters in factories and warehouses, or Unmanned Arial Vehicles (UAV) and drones for military or search and rescue operations can be included.

BACKGROUND OF THE INVENTION

In applications where RC or robotic vehicles and devices need refueling or reenergizing periodically, the normal procedure is to discontinue operations and either refuel or recharge the power system onboard or manually replace the fuel tanks (like propane tanks) or energy storage device (like batteries). Onboard refueling or recharging means the device is put out of operation until refueled or the batteries are recharged. While refueling typically can be done in a few minutes, recharging batteries usually takes 20 minutes or more for small devices like RC hobby cars, and several hours for larger devices like a warehouse transport vehicle. The down time for recharging battery powered vehicles is usually unacceptable and another vehicle or device is put into use if available. This means multiple vehicles, machines, or devices need to be purchased to perform the same operation that one could do if it could be reenergized instantaneously. Alternatively, exchanging depleted batteries with charged ones eliminates the problem of down time or having multiple devises or vehicles in reserve. However, presently virtually all battery exchanging is done manually. Even onboard charging is accomplished by manually plugging in a power cord. For RC or robotic vehicles, manually refueling, exchanging, or recharging can be a big problem if these vehicles operate in harsh or hazardous locations (a disaster or battle zone for example).

This invention replaces the manual operations of refueling, exchanging, or recharging fuel tanks, energy cells, or batteries on remote controlled vehicles, machines, and models, (collectively, the elements), with an automatic refueling, exchanging, and/or recharging service station (Automatic Service Station Facility, ASSF for short), which may include a battery charging system for automatically recharging batteries onboard elements or recharging removed batteries for exchange. The automatic refueling, exchanging, and charging operations is facilitated by the fact that these remote controlled elements are generally mobile, and can be directed to and made to interface with, the ASSF. Remote controlled can mean any number of ways of communicating control signals to the elements, including radio frequencies, light waves, infrared waves, microwave waves, etc., or electrically by wire as with some types of submersibles. An ASSF can also be utilized by any type of robotic element with autonomous mobility capability, where the element would steer or maneuver itself autonomously to and interact with the ASSF.

The various battery types' onboard alternative vehicles/elements may particularly include batteries of the following type: nickel-cadmium type batteries, nickel/metal-hydride type batteries, silver-zinc type batteries, lead-acid type batteries, and lithium-ion type batteries. In particular, when the battery of a RC or robotic vehicle becomes discharged during use, the vehicle's operator must then discontinue operations for a significant period of time while the vehicle's battery is recharged at a location with both a battery charger and space to park the vehicle (i.e., a charging site). In industry, to remedy such a problem, an operator of a RC or a robotic vehicle having a discharged battery typically switches vehicles by obtaining a replacement vehicle with a fully charged battery, or the operator may alternatively let the vehicle's battery recharge during off hours before using the vehicle again on a subsequent workday. Such discontinuity in use of a RC or robotic vehicles, however, is generally not practical for persons or organizations needing long-distance and/or frequent vehicle use.

Therefore, in view of the above, there is a present need in the art for an Automatic Service Station Facility (ASSF) that is both equipped and able to exchange, recharge, and/or replenish various fuels and battery types onboard different types of RC or robotic vehicles in short periods of time.

SUMMARY OF THE INVENTION

The present invention provides an automatic service station facility for exchanging or replenishing various motivational energy sources onboard different types of RC and robotic vehicles. In one embodiment, the automatic service station facility may include a rack, a plurality of replaceable batteries, a service module, and an electronic computer control system. The replaceable batteries are stocked on the rack and substantially charged. The service module is mounted on the rack, and the electronic computer control system is connected in electrical communication with the service module. In this configuration, the service module is controllably operable to receive a depleted replaceable battery from a RC or robotic vehicle and also selectively deliver one of the substantially charged batteries to the RC or robotic vehicle. The automatic service station facility may optionally further include a battery charging system for recharging the received depleted vehicle batteries while stocked/stored on the rack.

In another embodiment, the service station facility may include a rack, a plurality of replaceable fuel tanks, a service module, and an electronic computer control system. The replaceable fuel tanks are stocked on the rack and substantially filled with various fluids or gases utile as motivational energy sources within RC or robotic vehicles. The service module is mounted on the rack, and the electronic computer control system is connected in electrical communication with the service module. In this configuration, the service module is controllably operable to receive a depleted replaceable fuel tank from a RC or robotic vehicle and also selectively deliver one of the filled replaceable fuel tanks onboard the RC or robotic vehicle. In the same embodiment, the service station facility may optionally further include a plurality of replaceable batteries stocked on the rack for selective exchanging of batteries on RC or robotic vehicles in a manner as described in the first embodiment, and optionally further include a charging system for recharging the received depleted vehicle batteries while stocked/stored on the rack.

In another embodiment, the automatic service station facility may include a rack, a plurality of fuel storage tanks (liquid or gas), a fluid and/or gas pumping system, a liquid and/or gas cooling system, a service module, and an electronic computer control system. The fuel storage tanks are mounted on the rack and adapted to retain various fluids or gases utile as motivational energy sources within RC or robotic vehicles. The fuel pumping systems, cooling systems, and the service module are mounted on the rack and connected in fluidal communication with the fuel storage tanks and cooling tanks or reservoirs. The electronic computer control system is connected in electrical communication with the fuel pumping systems, cooling systems, and the service module. In this configuration, the service module is controllably operable to establish a polarity of fluidal connections with a RC or robotic vehicle. One fluidal connection can be for selectively delivering or injecting one of the various fuels into a depleted fuel tank onboard a RC or robotic vehicle. Another fluidal connection can be for selectively delivering or injecting one of the various cooling fluids or gases into and/or through the vehicle for the purpose of keeping batteries cooled while recharging. In the same embodiment, the automatic service station facility may optionally further include an electric charging system for substantially charging discharged batteries onboard RC or robotic vehicles as well. That is, not exchanging the batteries as in the first embodiment, but recharging them onboard. For this recharging, the service module is also controllably operable to establish an electrical connection with a RC or robotic vehicle.

In another embodiment, the automatic service station facility may be portable by any suitable means including wheels attached to its undercarriage so that it may be transported as in a trailer.

In another embodiment, the automatic service station facility may contain a propulsion system and be self-propelled through the use of any suitable propulsion means, including internal combustion engine (ICE), turbine engine, or electric motors. A propelled ASSF can be any number of propelled type vehicles, including a ground vehicle, aerial vehicle, vessel, or a submersible vehicle. With a propulsion system, the ASSF can be propelled to desired location either by remote controlled means or autonomously, so that it may service the RC or robotic vehicles in a location of need. These locations may be unfit or dangerous for humans, as in disaster zones or battle fields. Additionally, the ASSF can be propelled for economic purposes, to facilitate herding practices or product distribution for example. With an ICE or turbine engine, the ASSF may contain dedicated on board fuel tanks for the propulsion, or alternatively may use the fuel storage tanks used for refueling the RC or robotic vehicles described in another embodiment. With electric motors, the ASSF may contain dedicated on board batteries for the propulsion system, or alternatively may use the batteries stored for replenishing the RC or robotic vehicles described in another embodiment. A major advantage of using a battery powered electric propulsion system is that the batteries can be recharged autonomously, as needed, using solar voltaic arrays. With this type of propulsion system, solar arrays, or panels, would be included on the ASSF to recharge the propulsion batteries. The solar arrays can be made to deploy, expand, extend, or inflate, to create larger surface areas for collecting more solar energy. Secondary batteries, or equivalent means, can be included on the ASSF to store energy for use at night or during no-sun conditions. With periodic solar recharges, an ASSF can theoretically travel indefinitely by remote control or autonomously, to support long duration task or missions at great distances (herding for example). The same solar charging system for propulsion can be used to recharge the battery store for the RC or robotic vehicles the ASSF is supporting, or alternatively a separate system can be employed. With the store of batteries being periodically recharged, a fleet or squadron of RC or robotic vehicles, UAVs, or drones, can travel with, or migrate with, the ASSF. The ASSF would travel a distance the elements could travel on a single charge, wait for the elements to arrive at that location, and then systematically replace or recharge the element's batteries as the elements maneuvered onto and off the ASSF. After all the elements have been recharged, the ASSF would then move to the next recharging location. This process could continue indefinitely, given the proper sun, in a leapfrog manner. A rectifying antenna system can be included on the ASSF to collect beamed RF energy from external sources, to enable continues operation during long no-sun conditions or when larger amounts of energy are required. When the ASSF and its supported fleet arrive at the final destination, the elements can perform their task indefinitely by returning to the nearby ASSF for recharge or fast battery swaps. If the elements are deploying a payload for the task, munitions for example, a second, or more, ASSFs can be deployed carrying a store of payloads. The elements would then retrieve another payload from the second ASSF after recharging/swapping its battery, before returning to the task. Cycles of payload ASSFs can be deployed to the task site and returned in the same leap frog/recharging manner previously described. In this way, a task/mission can be continuously operated indefinitely.

Furthermore, it is believed that various alternative embodiments of the present invention will become apparent to those skilled in the art when the detailed description of the best mode(s) contemplated for practicing the present invention, as set forth hereinbelow, is reviewed in conjunction with the appended claims and the accompanying drawing figures.

BRIEF DESCRIPTION OF THE DRAWINGS

The present invention is described hereinbelow, by way of example, with reference to the following drawing figures.

LIST OF PARTS AND FEATURES

Figure 1:
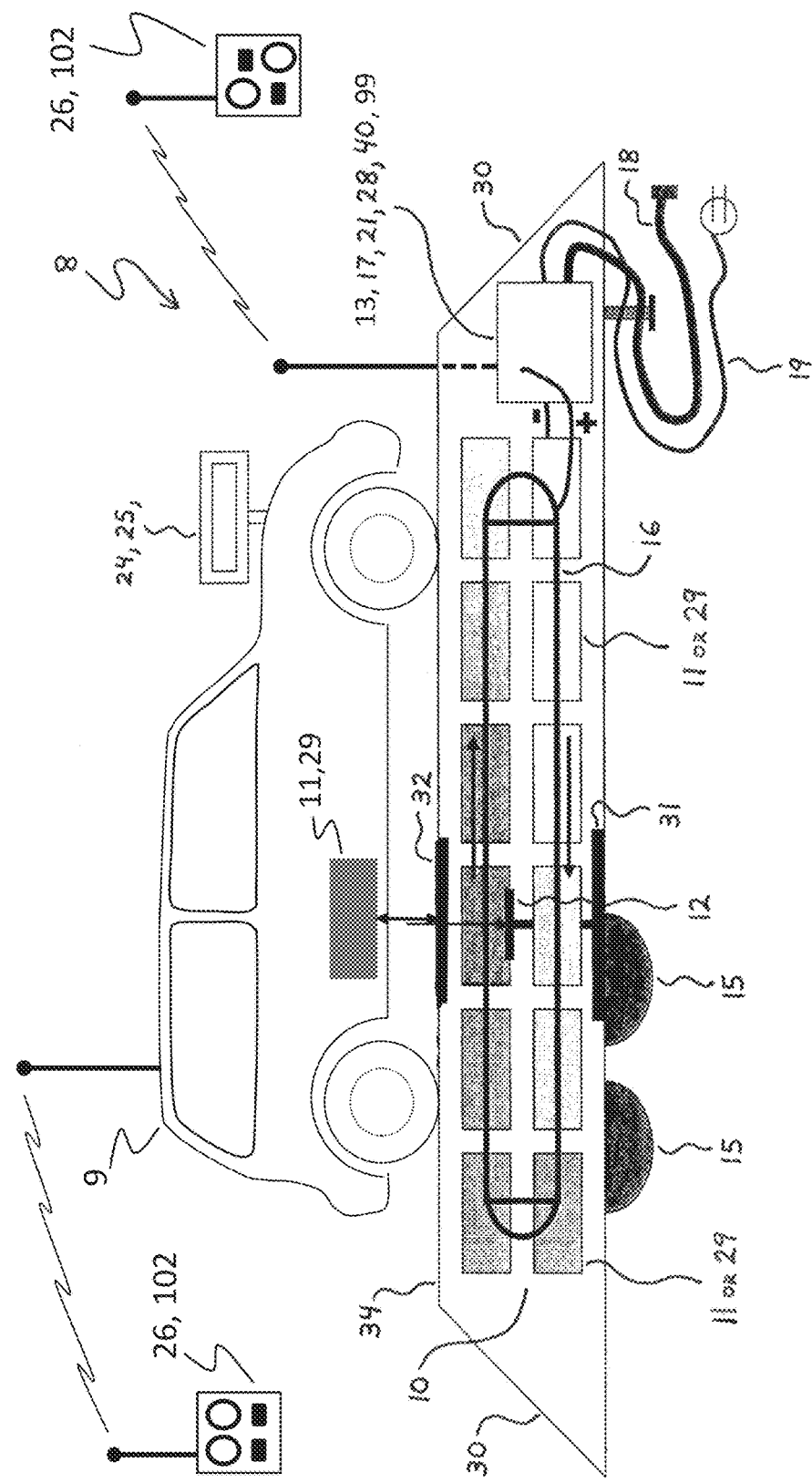
FIG. 1 illustrates a side view of one practicable embodiment of an ASSF for exchanging and charging batteries onboard different types of RC or robotic vehicles. In this view, the ASSF is portable.

To facilitate an understanding of the present invention, a list of parts and features highlighted with alphanumeric designations in FIGS. 1 through 7 is set forth hereinbelow.

8 ASSF (first embodiment as a towable trailer)
9 UAV, Drone, Vessel, Submersible, RC or Robotic Vehicle
10 rack or framework
11 fuel tank(s) or energy cell(s)
12 robotic service module
13 electronic computer control system
14 hitch or tow bar
15 wheel(s) (mounted at the bottom of the rack)
16 conveyor system
17 cooling system (for cooling batteries during charging)
18 hose (for receiving water)
19 cable (for receiving electricity)
20 ASSF (second embodiment as in-ground facility)
21 electric charging system (for recharging batteries)
22 position sensor(s) (for alignment of robotic service module to automotive vehicle)
23 identification scanner or transceiver
24 control panel
25 display monitor,
26 Remote controllers (for ASSF or RC vehicles for example)
27 storage tanks(s) (which may store, for example, fuels or water)
28 high-pressure fluid pumping system (for pumping, for example, fuels or water)
29 battery (or batteries)
30 foldable ramp(s) (for RC or robotic vehicles to egress and depart)
31 hydraulic lift system (for lifting and aligning the robotic service module)
32 service hole (in service platform)
33 fuel cell (which operates on hydrogen)
34 service platform (for UAV, Drones, or RC or robotic vehicles of any type)
35 stabilizer(s)
36 rack-and-pinion mechanism (for adjusting the robotic service module)
37 permanent vehicle guide rail(s) (for RC vehicles, for example)
38 guide rail(s) (for planes, for example)
39 signaling device (for giving RC or robotic driving instructions such as go, slow, stop)
40 heating and cooling system
41 transfer manifold (of conveyor system)
42 quick disconnect (breaks before rotation)
43 quick disconnect (makes before rotation)
44 dual quick disconnect manifold
45 slip ring
46 hose wheel (of conveyor system)
47 high-pressure liquid supply line (from cooling system)
48 liquid umbilical hose and/or electric cable
49 clamp(s)
50 transfer line(s) (liquid refilling or cooling hoses and/or electric recharging cables)
51 holding clamp assembly (for conveyor system)
52 electric power connector
53 electric power input connector
54 liquid inlet port (passing, for example, fuels or water)
55 retention pin(s)
56 holding clamp(s)
57 quick disconnect(s)
58 electromagnetic actuator (for example, a quick disconnect solenoid)
59 electromagnetic driver (for example, a clamping solenoid)
60 power and status signal cable (for heating system)
61 bearing(s)
62 roller bearing(s)
63 roller assembly
64 railing (of conveyor system)
65 pull chain
66 sprocket wheel (for engaging pull chain)
67 front end axle of conveyor system (driven by an electric step motor)
68 cooling vent(s)
69 hook-up (for receiving water)
70 hook-up (for receiving electricity)
71 controllable robotic arm (for moving fuel tanks, fuel cells, and batteries)
72 positionable carriage (for supporting robotic arm)
73 electric motor (for positioning robotic arm carriage on rail system)
74 rail system (for moving robotic arm about the rack)
75 in-ground enclosure (made of, for example, fiberglass)
76 bay area (for refilling liquid tanks and/or recharging batteries)
77 compartment
78 power source (for electric heater)
79 utility trough (for umbilical hoses, fuel and/or cooling hoses, and electric charging cables)
80 liquidizer and refrigeration system (chiller)
81 rail system (for moving and positioning the robotic service module)
82 ground level
83 vehicle retention mechanism(s)
84 alignment pin(s)
85 electric torque motor(s)
86 electric motor
87 jackscrew
88 electric motor (for adjusting the robotic service module)
89 motor mount(s)
90 electric power input connector
91 liquid inlet port (passing, for example, fuels or water)
92 hose coupler
95 ASSF (third embodiment as self-propelled facility)
96 Electric Propulsion System
97 Solar Arrays and/or rectifying antennas
98 Battery Pack
99 Avionics Compartment
100 Observation/Navigation Platform,
102 Remote Control/Command Vehicles/Centers (for ASSF command and control)

DETAILED DESCRIPTION OF THE INVENTION

Figure 2:
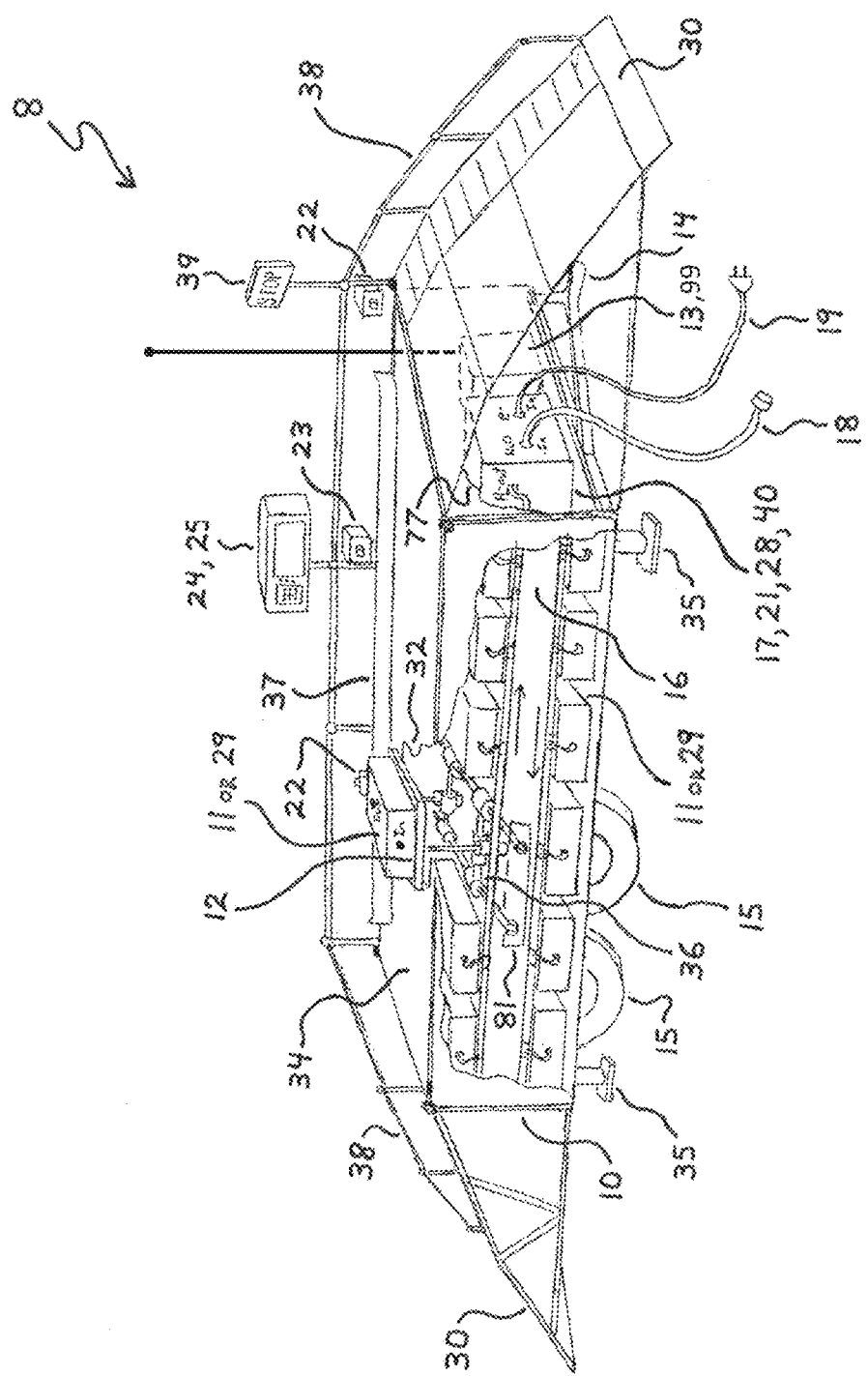
FIG. 2 illustrates a perspective view of the automatic service station facility depicted in FIG. 1. In this view, the ASSF is partially cut away and shown to include a rack and a plurality of replaceable batteries stocked on the rack by means of a circulating conveyor system.

FIGS. 1 and 2 respectively illustrate side and perspective views of one practicable embodiment of an automatic service station facility (ASSF) 8 pursuant to the present invention. In general, the service station facility 8 is adapted for replenishing various motivational energy sources onboard different types of RC or robotic vehicles.

As shown in FIGS. 1 and 2, the service station facility 8 includes a rack 10, a plurality of replaceable fuel tanks 11, a robotic service module 12, an avionics compartment 99, and an electronic computer control system 13. As used herein, the term "avionics compartment" may include a communication system with transmitters, receivers, and antennas, for receiving control commands from remote controllers 26, control vehicles, personnel, or centers 102, to perform various service operations, and also transmit situational and identification information in return. The replaceable fuel tanks 11 are stocked on the rack 10 and substantially filled with various fluids utile as motivational energy sources within fuel-operated RC or robotic vehicles. The robotic service module 12 is adjustably mounted on the rack 10 via a hydraulic lift system 31, a rack-and-pinion mechanism 36, and a rail system 81. The electronic computer control system 13 is connected in electrical communication with the robotic service module 12 and its adjusting systems and mechanisms as well. In this configuration, the robotic service module 12 is controllably operable to remove a depleted replaceable fuel tank from a fuel-operated RC or robotic vehicle 9 and also selectively install one of the filled replaceable fuel tanks 11 onboard the fuel-operated RC or robotic vehicle 9. The RC or robotic vehicle 9 may be remotely controlled by a remote controller 26 or any type of control center/personnel/vehicle 102 onto and off of the ASSF service platform 34. As used herein, the term "robotic service module" may include any electrically, mechanically, hydraulically, and/or pneumatically assisted arms or lever mechanisms.

In general, the replaceable fuel tanks 11 may be filled with many various types of fluids that are utile within fuel-operated automotive vehicles. As used herein, the term "fluid" may include either or both liquid and gaseous states, depending on context. Though other fluids are possible, some of these various fluids may particularly include, for example, biodiesel, bioethanol, biomethane, butanol, compressed air, compressed hydrogen, compressed natural gas, diesel, ethanol, gasoline, hydride, hydrogen, hythane, liquefied natural gas, liquid hydrogen, liquid nitrogen, methane, methanol, oxygen, P-series fuel, propane, vegetable oil, or some blend thereof.

As further shown in FIGS. 1 and 2, the service station facility 8 also includes a closed-loop conveyor system 16 on which the fuel tanks 11 are releasably held. The conveyor system 16 is mounted on the rack 10 and connected in electrical communication with the electronic computer control system 13. In this configuration, the conveyor system 16 is controllably operable to circulate the replaceable fuel tanks 11 about the service station facility 8 so that the robotic service module 12 has selective access to each of the fuel tanks 11.

As best shown in FIG. 2, the service station facility 8 further includes an electrolyzer system 17 for generating or producing hydrogen. The electrolyzer system 17 itself has both a hose 18 and a cable 19 for thereby receiving water and electricity from public utilities. The electrolyzer system 17 is connected in electrical communication with the electronic computer control system 13 and also controllably connectable in fluidal communication with any of the replaceable fuel tanks 11 on the conveyer system 16. In this configuration, the electrolyzer system 17 is controllably operable to receive both water and electricity to thereby produce hydrogen so as to substantially fill or refill any of the replaceable fuel tanks 11 on the conveyor system 16 that are designated for retaining hydrogen. Furthermore, it is to be understood that the electrolyzer system 17 for producing hydrogen, or any other fuel generation or storage system in general, may alternatively be situated in a second facility that is located near to the service station facility 8 and connected thereto via one or more fluid (for example, hydrogen) and/or electrical supply lines. Such an alternative arrangement may in some circumstances be desirable if a fuel generation or storage system is deemed to be too large to include within the service station facility 8. In this way, the service station facility 8 is still able to maintain its portability.

In addition to including the fuel tanks 11, the service station facility 8 also includes a plurality of replaceable batteries 29 stocked on the rack 10. In general, the batteries 29 are all substantially charged with electric charges that are sufficient and utile as motivational energy sources within battery-operated RC or robotic vehicles. As depicted in FIGS. 1 and 2, the replaceable batteries 29 are releasably held on the conveyor system 16 along with the fuel tanks 11. In this configuration, the conveyor system 16 is controllably operable to circulate the replaceable batteries 29 about the service station facility 8 so that the robotic service module 12 has selective access to each of the batteries 29. In this way, the robotic service module 12 is controllably operable to remove a discharged replaceable battery from a battery-operated RC or robotic vehicle and also selectively install one of the charged replaceable batteries 29 onboard the battery-operated RC or robotic vehicle.

In general, the plurality of replaceable batteries 29 stocked on the rack 10 may include many different types of batteries that are utile within battery-operated automotive vehicles. Though other types of batteries are possible, some of these batteries 29 may particularly include, for example, a lead-acid type battery, a lithium-ion type battery, a nickel-cadmium type battery, a nickel/metal-hydride type battery, or a silver-zinc type battery.

As shown in FIGS. 1 and 2, the service station facility 8 further includes an electric charging system 21 for recharging any batteries 29 on the conveyor system 16 that are discharged. The electric charging system 21 is connected in electrical communication with the cable 19 for thereby receiving electricity from a public utility, or from a local power generating facility such as a solar powered generator mounted on a trailer. In addition, the electric charging system 21 is connected in electrical communication with the electronic computer control system 13 and also controllably connectable in electrical communication with any of the replaceable batteries 29 on the conveyor system 16. In this configuration, the electric charging system 21 is controllably operable to substantially charge any of the replaceable batteries 29 on the conveyor system 16 that are designated for recharging.

As best shown in FIG. 2, the service station facility 8 further includes a plurality of wheels 15, a hitch 14, and one or more stabilizers 35. The hitch 14 is mounted on one end of the rack 10, and the wheels 15 are rotatably mounted at the bottom of the rack 10. In this configuration, both the hitch 14 and the wheels 15 facilitate towing of the service station facility 8 by, for example, a RC or robotic vehicle, where the towing vehicle can optionally be serviceable by the ASSF itself. Whenever the service station facility 8 is unhitched, each stabilizer 35 helps balance and stabilize the service station facility 8 so that an RC or robotic vehicle 9 can be safely driven up one of the ramps 30 and onto the facility's service platform 34 for service.

As further shown in FIG. 2, the service station facility 8 also includes one or more position sensors 22 and an electronic signaling device 39. The position sensors 22 and the signaling device 39 are all mounted at the top of the rack 10 and about the service platform 34. Both the position sensors 22 and the signaling device 39 are connected in electrical communication with the electronic computer control system 13. In this configuration, each position sensor 22 is controllably operable to sense the position of an RC or robotic vehicle 9 relative to the service station facility 8 and its main service features, such as both the service hole 32 and the robotic service module 12 on the facility's service platform 34. In this way, proper alignment and controlled operation of the robotic service module 12 relative to the RC or robotic vehicle 9 is facilitated while the RC or robotic vehicle 9 is serviced on the platform 34. In this same configuration, the signaling device 39 further facilitates proper alignment between the RC or robotic vehicle 9 and both the service hole 32 and the robotic service module 12 by displaying various driving instructions to the driver/operator of a RC vehicle, or by transmitting positional signals or commands to a robotic vehicle 9 as dictated by the position sensors 22. Some of the driving instructions displayed on the signaling device 39 for a RC vehicle may include, for example, "go," "slow," "stop," or even others.

In addition to the above, the service station facility 8 also includes a transceiver 23. The transceiver 23 is mounted at the top of the rack 10 and situated along one side of the service platform 34. The transceiver 23 is also connected in electrical communication with the electronic computer control system 13. Situated and connected as such, the transceiver 23 is controllably operable to establish electromagnetic communication with a RC or robotic vehicle 9 to be serviced and thereby identify the vehicle 9 so that the robotic service module 12 can service the vehicle 9 accordingly. By initially identifying an RC or robotic vehicle 9 in this way, the electronic computer control system 13 can control the robotic service module 12 so as to install the proper type of fuel tank 11 (containing the proper type of fuel) or the proper type of battery 29 into the vehicle 9.

As best illustrated in FIGS. 1 and 2, the service station facility 8 further includes a control panel 24, and a display monitor 25. The control panel 24 and the display monitor 25 are mounted at the top of the rack 10 and situated along a side of the service platform 34. In addition, they are all connected in electrical communication with the electronic computer control system 13 as well. Situated and connected as such, the control panel 24 and the display monitor 25 facilitate controlled operation of the service station facility 8 by a service attendant.

Figure 3:
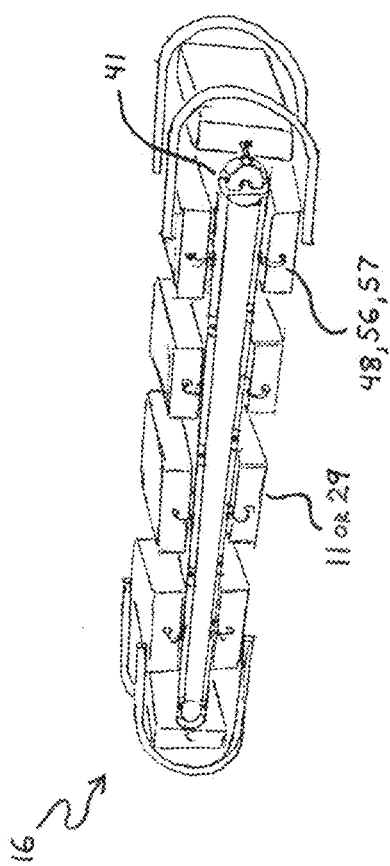
FIG. 3 illustrates a perspective view highlighting the circulating conveyor system depicted in FIG. 2.

FIG. 3 illustrates a perspective view of the conveyor system 16 depicted in FIG. 2. In this view, the two rotating end shafts, the semicircular end guide rails, the holding clamps 56, and the rotating transfer manifold 41 of the conveyor system 16 are all highlighted.

Figure 4:
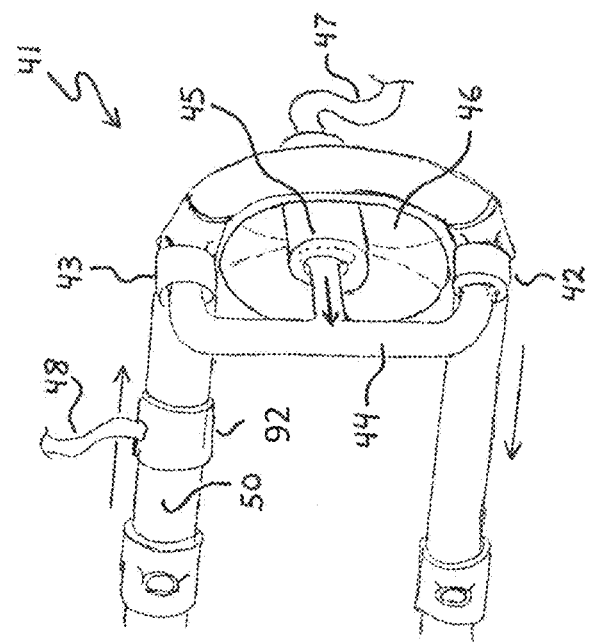
FIG. 4 illustrates a perspective view of a transfer manifold of the circulating conveyor system depicted in FIG. 3.

FIG. 4 illustrates a perspective view of the rotating transfer manifold 41 of the conveyor system 16 depicted in FIG. 3. In this view, the dual disconnect system of the transfer manifold 41 is highlighted. As shown in FIG. 4, the dual disconnect system particularly includes one make-before-rotate quick disconnect 43 and one break-before-rotate quick disconnect 42, which are situated 180 degrees away from each other about the transfer manifold's hose wheel 46. In general, such a dual disconnect system eliminates the need for fuel fill-line hoses to circulate with the conveyor system. For multiple fuel types and/or cooling fluids, a series of rotating manifolds 41 can be stacked axially.

Figure 5:
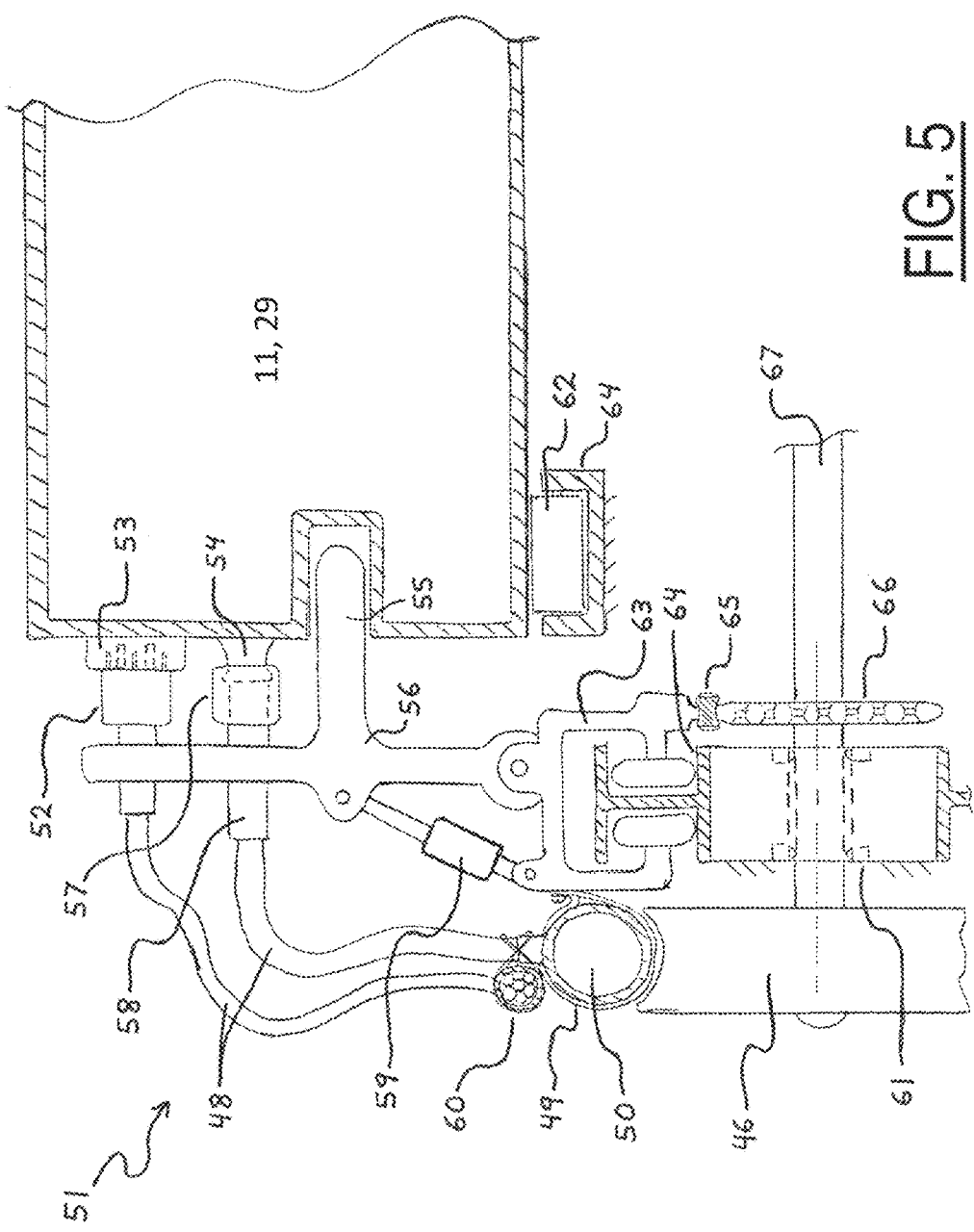
FIG. 5 illustrates a partial sectional view of a holding clamp assembly of the circulating conveyor system depicted in FIG. 3.

FIG. 5 illustrates a partial sectional view of one holding clamp assembly 51 of the circulating conveyor system 16 depicted in FIG. 3. In this view, the holding clamp assembly 51 is shown to ride on the railing 64 about the conveyor system 16 as driven by a pull chain 65 and a sprocket wheel 66. As further shown in the view of FIG. 5, the holding clamp 56 of the assembly 51 operates to both engage and lock onto a fuel tank 11 on the conveyor system 16 and also pull the fuel tank 11 around the conveyor system 16 so that the tank 11 rides on rail-mounted roller bearings 62. At about the same time that the holding clamp 56 of the assembly 51 locks onto the fuel tank 11, both a fluidal connection and an electrical connection are respectively made with the fuel tank 11 via an electric power connector 52 and a quick disconnect 57. To later transfer the fuel tank 11 from the conveyor system 16 to the robotic service module 12 for installation onboard an automotive vehicle 9, both the fluidal connection and the electrical connection established by the holding clamp assembly 51 with the fuel tank 11 are broken so as to release the tank 11 from the conveyor system 16.

Figure 6:
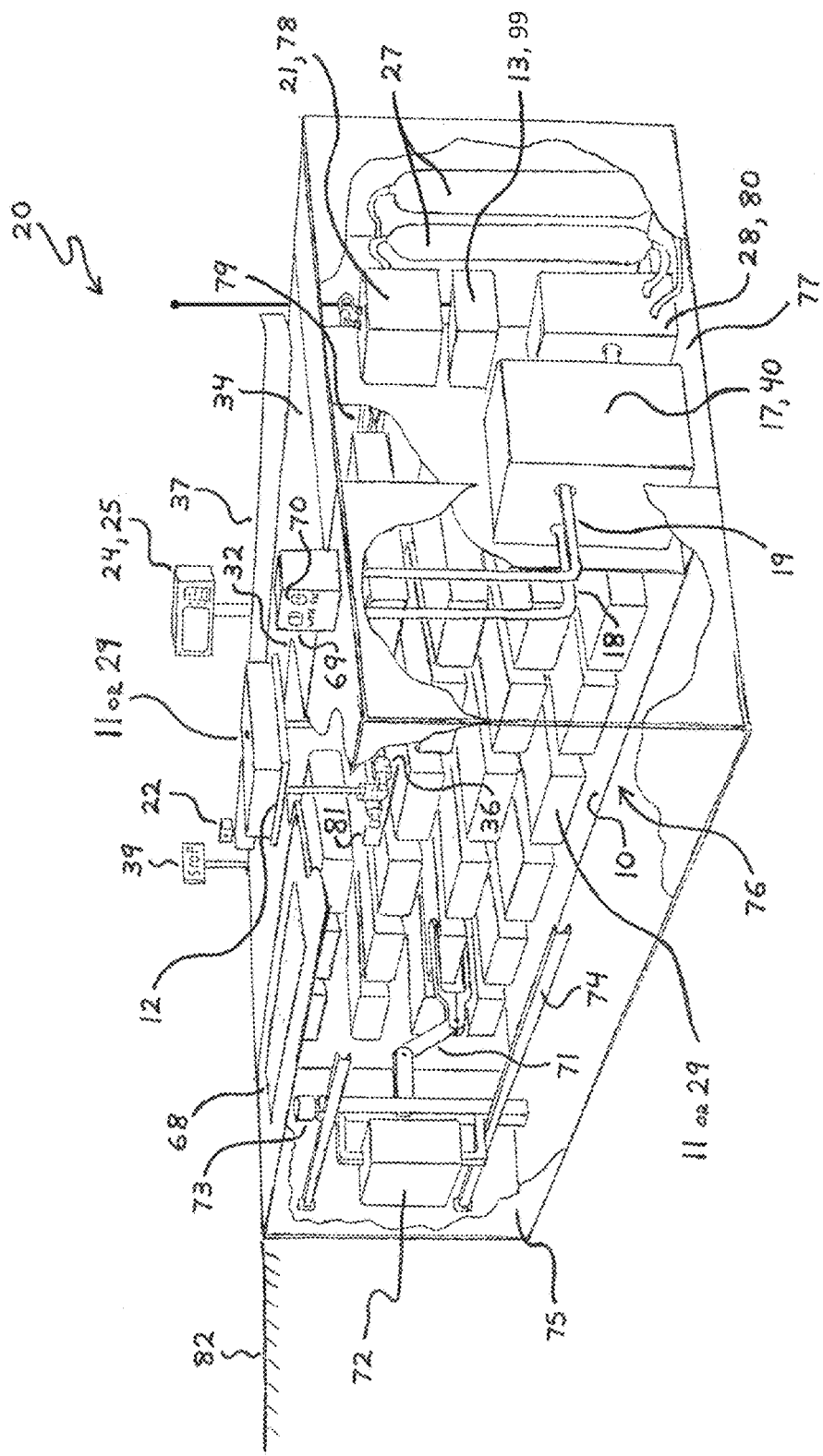
FIG. 6 illustrates a perspective view of another practicable embodiment of an ASSF. In this view, the ASSF is stationary, and is partially cut away and shown to include a rack and a plurality of replaceable batteries stocked on the rack by means of a robotic arm engaged on a rail system.

FIG. 6 illustrates a perspective view of another practicable embodiment of a service station facility 20 pursuant to the present invention. In this view, the service station facility 20 is shown to be largely prefabricated and housed in an enclosure 75 that has been lowered into an excavated hole in the ground. As a result, the service station facility 20 has a service platform 34 that is substantially even with ground level 82.

In the embodiment depicted in FIG. 6, the service station facility 20 does not include a conveyor system for moving and stocking fuel tanks and batteries as does the facility 8 in FIGS. 1 and 2. Instead, the service station facility 20 includes a bay area 76 wherein both replaceable fuel tanks 11 and replaceable batteries 29 are stocked and stored on a shelf-like rack 10. To move the fuel tanks 11 and the batteries 29 about the facility's bay area 76 and both onto and off of the robotic service module 12, the service station facility 20 alternatively includes a controllable robotic arm 71 mounted on a carriage 72. The carriage 72 along with the robotic arm 71 are positionable about the facility's bay area 76 by means of a rail system 74. The carriage 72 is engaged on the rail system 74 and is moved thereon by an electric motor 73. The carriage 72 and its electric motor 73 are both connected in electrical communication with the facility's electronic computer control system 13 so as to control all movement of the robotic arm 71.

As further shown in FIG. 6, the service station facility 20 also includes a plurality of supplemental fuel storage tanks 27 and a high-pressure fluid pumping system 28. The fuel storage tanks 27 are mounted on the rack 10 and adapted to retain various fluids utile as motivational energy sources within fuel-operated automotive vehicles. One or more of the fuel storage tanks 27 themselves may initially be filled by an electrolyzer system 17 (in the case of hydrogen) connected thereto or by external means. The fluid pumping system 28 is also mounted on the rack 10 and connected in fluidal communication with the fuel storage tanks 27. The electronic computer control system 13 is connected in electrical communication with the fluid pumping system 28. In this configuration, fluid (i.e., fuel or water for example) may generally be controllably pumped by the fluid pumping system 28 from the fuel storage tanks 27 and into the replaceable fuel tanks 11 in the bay area 76. Establishing a fluidal connection between one of the fuel storage tanks 27 and one of the replaceable fuel tanks 11 for successfully transferring fluid therebetween for refilling the tank 11 is particularly accomplished with help from the robotic arm 71.

In addition thereto, the service station facility 20 also includes an electric charging system 21. The electric charging system 21 is mounted on the rack 10 and connected in electrical communication with the electronic computer control system 13. In this configuration, electric current may generally be controllably communicated from the electric charging system 21 and into the replaceable batteries 29 in the bay area 76. Establishing an electrical connection between the electric charging system 21 and one of the replaceable batteries 29 for successfully transferring electric current therebetween for recharging the battery 29 is particularly accomplished with help from the robotic arm 71.

In a possible alternative embodiment, it is to be understood that the fuel storage tanks 27 may be directly connected in fluidal communication with the robotic service module 12 itself. In such a configuration, the robotic service module 12 would be controllably operable to establish fluidal communication with a fuel-operated RC or robotic vehicle and also selectively inject one of the various fluids from the fuel storage tanks 27 directly into a depleted fuel tank onboard the vehicle. Similarly, it is to be understood that the electric charging system 21 may be directly connected in electrical communication with the robotic service module 12 as well. In this way, the robotic service module 12 would be controllably operable to establish electrical communication with a battery-operated RC or robotic vehicle and also substantially recharge a discharged battery onboard the vehicle.

Figure 7:
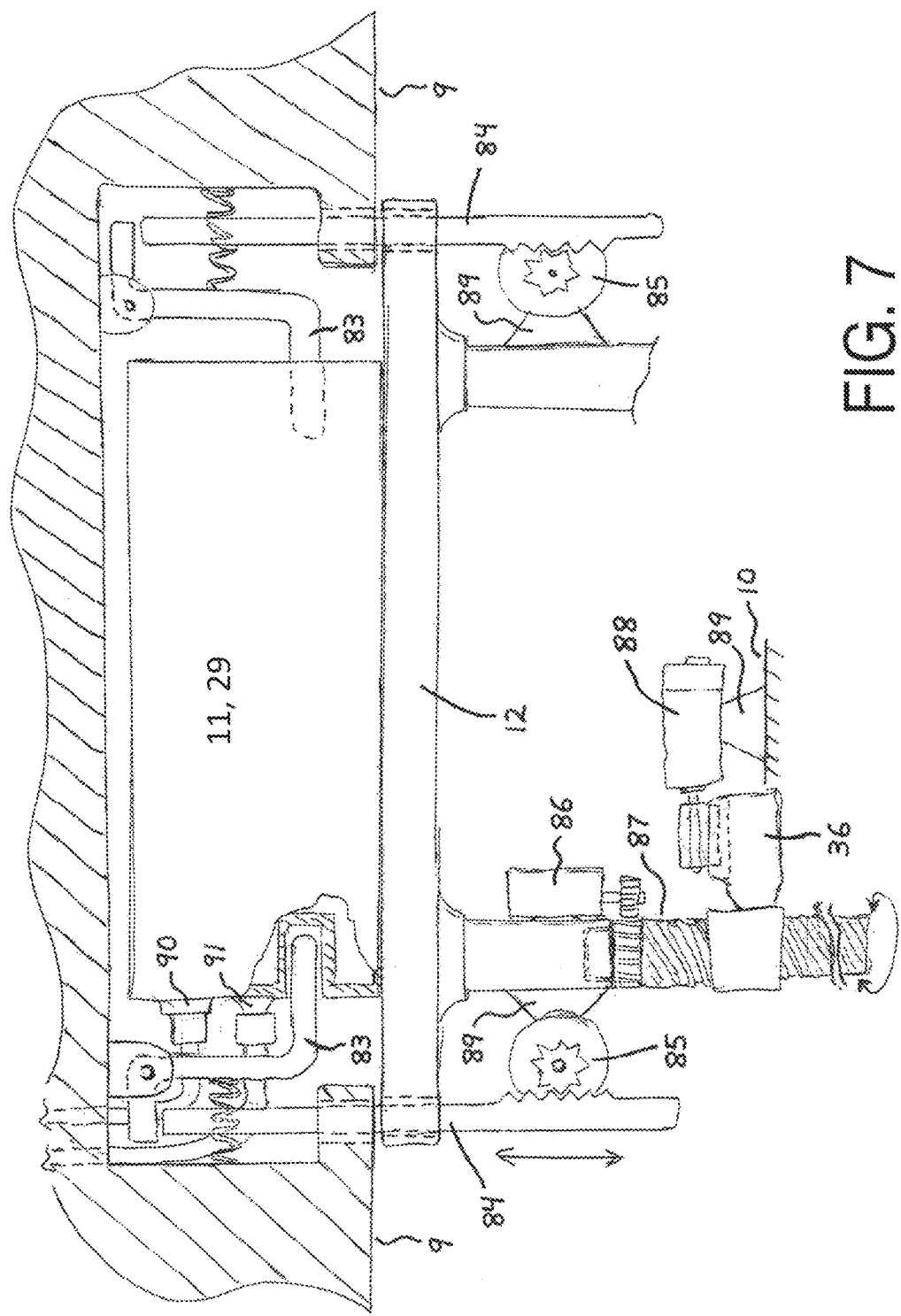
FIG. 7 illustrates a partial sectional view of a robotic service module mounted on the rack of the service station facility depicted in FIG. 6. In this view, the robotic service module is engaged underneath the battery of a vehicle being serviced.

FIG. 7 illustrates a partial sectional view of the robotic service module 12 adjustably mounted on the rack 10 of the service station facility 20 depicted in FIG. 6. In this view, the robotic service module 12 is engaged underneath the fuel tank 11 of an RC or robotic vehicle 9 that is being serviced. As also shown in this view of FIG. 7, the RC or robotic vehicle 9 includes one or more retention mechanisms 83 for releasably holding the fuel tank 11 in place after the tank 11 is installed by the robotic service module 12. As further shown in FIG. 7, the robotic service module 12 includes one or more electric torque motors 85 engaged with a matching number of vertical alignment pins 84, which ensure proper engagement of the service module 12 and the vehicle 9 while also releasing the retention mechanism 83. The jackscrew 87 and the electric motor 88 are used for moving the robotic service module 12 up and down with its fuel tank load. Equipped as such, the robotic service module 12 can thus remove a depleted fuel tank from the vehicle 9 and also install a full fuel tank 11. Furthermore, in FIG. 7, the robotic service module 12 is also shown to have both an associated rack-and-pinion mechanism 36 and an associated electric motor 88 mounted on the rack 10 of the service station facility 20. Together, the rack-and-pinion mechanism 36 and the electric motor 88 work to adjust and position the robotic service module 12 for proper lateral alignment with the RC or robotic vehicle 9.

Figure 8:
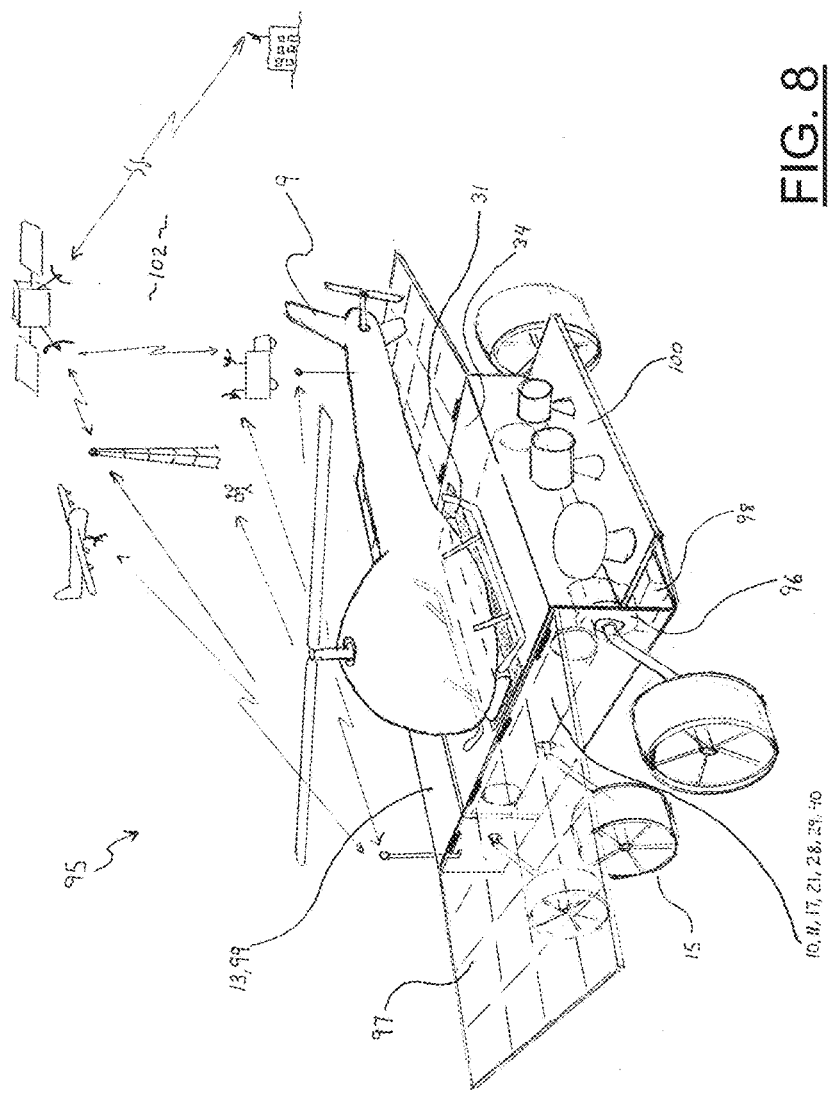
FIG. 8 illustrates a perspective view of another practicable embodiment of an ASSF. In this view, the ASSF is a mobile unit with an electric propulsion system. Deployed solar arrays are shown, which are used to recharge the ASSF battery pack and store of swappable element batteries. An UAV is shown on the deck of the ASSF getting a battery swap. The ASSF is shown in communication with any number of command control centers or relay links, including a mobile ground command center, an aerial command center, a cell phone tower, or communication satellite.

FIG. 8 illustrates a perspective view of another practicable embodiment of the ASSF 95. In this view, the ASSF 95 is a mobile unit with an electric propulsion system 96. Deployed solar arrays 97 are shown, which are used to recharge the ASSF battery pack 98 and store of swappable element batteries 29 or energy cells 11 via a battery charger 21. The battery pack 98 is used to supply energy to the electric propulsion system 96, which may contain any number of electric motors, gear boxes, and associated equipment to drive/propel the wheels 15 of the ASSF. An UAV element 9 is shown on the deck of the ASSF 95 getting a battery swap from the service module 31. The ASSF 95 is shown in communication with any number of command control centers, personnel, vehicles, or communication relay links, including a mobile ground command center, an aerial command center, a cell phone tower, or communication satellite (collectively) 102. In this configuration, the Avionics Compartment 99 contains the communication system, transmitters, receivers, amplifiers, antennas, along with a Guidance, Navigation, and Control (GNC) system. The GNC may contain navigational gyroscopes, accelerometers. Global Positioning System (GPS), Inertial Navigation Unit (INU), and computer processing 13 in communication with GNC and vehicle sensors and cameras on the observation/navigation platforms 100, in order to perform maneuver commands or autonomously transverse to desired locations per software commands. The observation sensors may include video cameras, radar, LIDAR, or any similar device for sensing surroundings and obstacles for navigating or situational response purposes. Supporting elements 9 may also transmit navigational data to the ASSF 95 if needed via the communication system of the avionics compartment 99. Included on the ASSF may be an Automatic Rendezvous and Docking (AR&D) system, to facilitate in guiding the elements 9 to the platform/deck 34 for engagement with the service module 31. The AR&D system may be comprised of components described herein within and on the ASSF, including those of the GNC, sensors on the observation/navigation platforms, and the communication system.

In general, the present invention as described hereinabove is able to supply the appropriate fuel type, fuel-tank type, battery, or energy cell at needed locations in a cost effective and timely manner. It is anticipated that the invention when properly implemented will allow continuous operation of AUV, Drones, RC and robotic vehicles when needed.

In essence, the above-described automatic service station facility ASSF is an Energy Rack for Inserting and Charging replaceable energy storage cells or devices such as batteries, fuel cells, fuel tanks, hydrogen tanks, and the like. The ASSF can be constructed to provide conventional tank refueling and battery recharging services in combination with tank and battery exchange capabilities.

A service station facility pursuant to the present invention may be a stationary or permanent structure like the above-described facility 20. It is anticipated, however, that the mobile facility 95 or portable facility 8, which can easily move or be moved long distances to locations in demand of a particular type of replaceable energy storage cell, will be highly functional and more effective in facilitating remote operations on battlefields, in hazardous or disaster locations for search and rescue operations, or for long duration task like herding cattle for example. UAV, or Drone planes used in battle or for surveillance, for example, can be refueled or re-energized safely by using an ASSF remotely as described herein, using a remote control to initiate fuel transfers, recharges, or fuel tank or battery exchanges, or simply automatically servicing the RC or robotic vehicle when such vehicles make proper contact with the ASSF.

The ASSF 8 can be made portable through use of any suitable transportation means, including being carried in or on transportation vehicles like trucks or cars, or pallets of any kind. More practically, however, the facility 8 is best made portable by means of wheels 15 attached to its undercarriage, as in a trailer. Having such wheels 15 enables the facility 8 to be easily towed, moved, pulled, and ultimately parked by most any type of transportation means, including another RC or robotic vehicle, to desired locations in a timely and cost effective manner.

The ASSF 95 can be self-propelled by way of any suitable propulsion means, including electric motors, Internal Combustion Engine, or Turbine engine, connected to the proper actuators to create movement. The actuators may be any number of devices, such as wheels for ground movement, or propellers for flight.

As also described hereinabove, a Stationary Energy Rack for Inserting and Charging replaceable energy storage cells or devices such as batteries, fuel cells, fuel tanks, and hydrogen tanks of various kinds is proposed herein as well. This type of automatic service station facility ASSF 20 may be more desirable in factories or warehouses, where cargo or inventory is moved about systematically by RC or robotic vehicles. This ASSF type 20 is a stationary or permanent structure, which may be prefabricated and dropped into an excavated site. When utilizing such a service station facility 20, automotive RC or robotic may simply be driven onto a ground-level service platform 34 to be serviced.

The ASSF 8, 20, and 95 each include a sturdy framework or rack 10 that is able to support a UAV, Drone, RC or robotic vehicles of any kind or technology or mobility (Elements), to drive or fly onto, or be pulled or pushed by external means onto, the top of the ASSF or the service platform 34. The ASSFs may also be constructed to provide service to Elements 9 positioned alongside each facility instead of on top each facility. In this way, the ASSFs would each have vertical servicing capability.

The ASSFs also incorporate within their respective structures a robotic servicing apparatus or service module 12 for refueling, or exchanging fuel or energy cells in vehicles 9, automatically or autonomously. A single robotic service module 12 is generally employed to do both refueling and a tank or battery exchange, but two or more service modules may alternatively be installed wherein each service module is dedicated to a separate function. With removable fuel tanks or energy cells, the robotic service module 12 will be equipped with mechanisms for first decoupling a vehicle's fuel tank or energy cell, and then lowering it to a stowed position within the rack 10 for the purpose of refueling or recharging. Thereafter, the robotic service module 12 will reinstall a refilled/recharged tank/cell/battery into the vehicle 9, thereby ensuring that the tank/cell/battery is connected properly and secure onboard the vehicle 9. Once servicing of the vehicle 9 is completed, a user pre-serviced fuel tank level or battery charge can be subtracted from the cost of a full tank or full battery charge. Furthermore, in the case of a vertically oriented system, the robotic service module 12 may automatically replace or replenish a desired fuel source.

The ASSFs are constructed and designed to move their respective robotic service modules 12 to specific locations on a serviced vehicle 9 where the vehicle 9 needs to be serviced. Alternatively or in combination therewith, the facilities may also be constructed with means to position each vehicle 9 in a specific orientation on the rack 10 or service platform 34 for proper alignment, so as to service the vehicle 9 with a fuel tank, energy cell, or battery of any type as required by the vehicle 9. For example, in some constructed facility configurations, vehicles may be pulled up alongside the facility. Thereafter, the tank/battery exchange or refueling/recharging may be carried out in an automated manner.

The refueling capability is accomplished by providing onboard fuel storage tanks 27, fuel transfer lines, electric cables, and fuel pumps or battery chargers and also cable hook-ups. The storage tanks 27 may be refilled by onboard fuel generators or electrolyzer systems 17. In addition thereto or alternatively, they may also be refilled via one or more external sources such as, for example, a tanker truck, manually, or even one or more stationary pipelines.

Primarily, or in combination, the ASSFs are constructed to service vehicles 9 with removable fuel cells, tanks, or energy storage devices such as batteries. The facilities will contain within their respective mid sections a store of appropriate tanks or cells that are completely full or recharged, and will replace or exchange a vehicle's removed tank/cell with a pre-replenished one. Alternatively, the facilities may be interfaced with an adjacent store or silo of tanks or cells for the exchange. In general, the exchange method implemented in these facilities is highly efficient in that no refill/recharge time is required, which can take several minutes to hours, especially for batteries, in a more conventional facility. That is, in facilities, an operator may simply maneuver the vehicle 9 onto or alongside the service platform 34 of the facility, wait a few seconds for the exchange to take place, and then simply maneuver the vehicle 9 away. Such a brief and timely exchange is one of the most desirable aspects of both the ASSF.

An example structure for the ASSF 8 is a rectangular framework or rack 10 that is constructed with a truss to support automotive vehicles 9 parked on top, to hold replaceable fuel cells stored in recharging bays, or to hold a rotating conveyer system 16 of cells. A rail system 81 for moving each of the robotic service modules 12, or a rail system 74 for moving the robotic arm 71 are each mounted to the respective framework or rack 10 of the service station facilities 8 and 20. Each framework or rack 10 also includes compartments 77 for refueling storage tanks 27, fuel generators or electrolyzer systems 17, heating and cooling units, and electronic computer control systems 13. Twin axial wheels 15 and stabilizers 35 are mounted to the undercarriage of the ASSF 8, along with a tow bar 14 mounted to the front, to thereby form a mobile trailer.

An example structure for the ASSF 20 is similar to the ASSF 8, except that the mobility aspect is not present in the ASSF 20. Instead, the ASSF 20 is constructed to be modular so that it can easily be placed into the ground using at a desired destination site. The ASSF 20 is substantially enclosed with, for example, fiberglass walls for thereby withstanding any adverse effects from the elements of in-ground environments.

An electronic computer control system 13 is mounted within each facility's controls for thereby refueling or exchanging cells or tanks within vehicles. Mounted as such, the electronic computer control system 13 operates to control and monitor the recharging of spent cells or tanks, and also controls any communication links established between the service station facility itself, the vehicles 9, and the control panel 24. The electronic computer control system 13 is loaded with autonomous software for the automatic or autonomous control of the overall facility. Such control may particularly include, for example, the positioning of the robotic service module 12 for proper vehicle alignment, the monitoring and moving of the fuel or cells to and from the vehicles, the assuring of proper connections of fueling hoses and cables for safe operation, and also the monitoring and controlling of communication interfaces between the facility itself, the vehicles 9, and the service control panels 24.

The electronic computer control system 13 interfaces with the facility's proximity or position sensors 22 for thereby determining the relative locations of vehicles 9, and the computer control system 13 also calculates the required repositioning for proper alignment. Such location information is also used to communicate directions to a user through the control panel's associated display monitor 25 and electronic signaling device 39 mounted on the front of the service station facility. The direction commands given by the signaling device 39 may instruct a vehicle operator to, for example, pull forward and stop as necessary for proper refueling or for a proper tank exchange to take place.

In addition to the above, each service station facility has means for interacting with and sensing the type of vehicles, to determining the fuel type requirement along with the quantity of fuel to be replenished, or the cell type and state of charge. The interaction protocol and identification code definitions may be developed by collaboration with industry. The vehicle codes can be attached to the vehicles in an established location in the form of magnetic strips or barcodes for reading by one or more sensors or transceivers 23 mounted on the facility. However, this type of link is limited in that no variable information can be transmitted from the vehicles to the facility about fuel or charge levels. A better alternative is for the facility and vehicles to have a communication link by means of infrared transceivers, electrical signal contacts, wireless Radio Frequency, or RF Identification (RFID) means. These types of communication links can transmit the vehicle type, along with fuel type and level, or cell type and charge. The transmitted vehicle information is then communicated to the facility's electronic computer control system 13. The computer control system 13 may then control any actions necessary for properly servicing the vehicle.

If refueling, the level of refueling can be controlled by the vehicle operator himself, or by an ASSF operator or service attendant, via the control panel 24 mounted on the facility, with the control panel 24 more preferably made accessible to the operator by remote control means. In an alternative embodiment, a second control panel may be mounted on the side of the rack 10 for access by an operator. Such an additional control panel may also be remotely operated via a cable or a wireless connection to the facility by an ASSF operator or service attendant.

After the ASSF 8 or 95 has determined the vehicle fuel or cell requirements, the facility will automatically move the robotic service module 12 to the fueling or exchange location on the vehicle, and autonomously exchange the cell, or refuel the vehicle. The exchange process is performed by removing the spent cell from the vehicle, and then placing it onto the conveyor system 16. A fresh cell is then rotated by the conveyor system 16 to the insertion position. In contrast, in the ASSF 20, the robotic arm 71 may move the cell to the bay area 76 for recharging, and the arm 71 may also retrieve a fresh unit for replacement and installation in the vehicle. In collaboration with industry, a standard retention mechanism 83, for example, may be defined for various types of cells or tanks so as to hold the cells or tanks in the undercarriage of their respective vehicles. The robotic service module 12 will achieve alignment with the vehicle retention mechanism 83 by means of the position sensors 22. The robotic service module 12 then engages the retention mechanism 83 via alignment pins 84, and then actively causes the retention mechanism 83 to release the cell or tank 11 from the vehicle 9. This can be accomplished, for example, by rotating a screw type locking bolt of the retention mechanism 83 by using an electric torque motor 85. The robotic service module 12 is maneuvered within the facility 20 also by electric motors on the rail system 81 via wheels or bearings. Alternatively, the robotic service module 12 may be positioned by a rack-and-pinion mechanism 36. Also, the robotic service module may lift and lower cells or tanks using another electric motor and a jackscrew lift, or alternatively a hydraulic jack lift system 31. The robotic arm 71 along with its carriage 72 may maneuver in a similar manner, except that the robotic arm 71 itself will perform the lowering, lifting, and placing of the cells or tanks into the bay area 76 for charging. The robotic arm 71 may be somewhat more versatile in that the interface definition of the individual cells and tanks can be somewhat varied and less narrowly defined. That is, given the robotic arm's dexterous clamp or claw on its distal end and also its intelligent controlling software, the robotic arm 71 may be utilized to grasp and move cells and tanks having multiple different configurations.

Alternatively or in combination with each robotic service module 12, the ASSFs may be constructed with a movable service platform to help position the vehicles in a specific orientation for proper alignment. Such can be accomplished, for example, by using hydraulic cylinders or electric motors connected to a floating service platform on bearings. The cylinders would extend or retract as directed by the electronic computer control system 13. In such an embodiment, the computer control system 13 sends position commands to cylinder valve controllers and receives position feedback signals from position sensors on the service platform. A simpler method, however, would be to use a guide rail 37 mounted to the service platform 34. Such will force the vehicle operator to place the vehicle in an approximate initial alignment position. Thereafter, final alignment may easily be achieved via the mobility of the robotic service module 12 itself.

If a refueling process is required, the robotic service module 12 will autonomously connect a fueling hose or appendage as required to refuel the vehicle. This again, can be accomplished by defining interface requirements with industry, and having the service module 12 maneuver the hose with gears, levers, screws, and sensors in a predefined manner for positive engagement. A robotic arm with intelligent software, however, may again be a better approach for thereby ensuring versatile engagement capability.

Preferably, the vehicle fueling port would be located on the undercarriage of the vehicle, for ease of the mating process, but such is not a necessary restriction. For side-mounted fueling ports on vehicles, the ASSF 8 or 95 will have side-mounted robotic service modules for vehicles to park alongside. For vehicles pulled on top of the facility, top-protruding side service modules 12 will be utilized. In general, side-fueling robotic service modules will operate and maneuver in a similar manner as the undercarriage-fueling service modules 12.

One method of stowing and refilling/recharging the tank/cell is for the facility to contain within its midsection, a conveyor system 16 to move the removed tanks/cells around a closed loop while being refilled/recharged. In this manner, the removed units are rotated out of the way, while the replenished units are simultaneously rotated into position for installation by the robotic service module 12. The length of the conveyor system 16, and consequently the number of stowed units, can be adjusted to meet the supply demand in concert with the refilling or recharging timing requirements.

In general, the conveyor system 16 includes a chain with holding clamps that automatically grasp the tank/cell when put in place by the robotic service module 12. Also mounted to the chain and split off to the clamps, are fuel umbilical hoses and/or electric cables 48 for refueling and recharging. The clamps are spaced on the chain with a spacing to accommodate the predefined tank/cell sizes. The clamp devices incorporate sensors to sense when a tank/cell is placed, triggering a clamping action. The clamping action is electromagnetically driven, but could be actuated by pneumatic means as well. The clamps also contain alignment sensors and quick disconnects for aligning and connecting the umbilical hose or cables 48. The umbilical devices will contain quick disconnects, connectors, or brushes as needed to temporarily connect the tanks/cells as they are placed and removed from the conveyor system 16 by the robotic service module 12. The clamps also contain electromagnetic actuators and sensors for aligning and establishing these temporary connections, which occurs after the clamping device confirms a positive tank/cell clamp.

The conveyor system 16 itself is rotated by an electric step motor, but can also be rotated by a hydraulic or pneumatic motor as well. Operation of the conveyor system motor is controlled by commands given by the electronic computer control system 13. The required fuel and charge is transferred from storage tanks and generators to the conveyor refueling and recharging hoses and cables, by a slip ring 45 mounted to a conveyor hose wheel 46 at one end of the conveyor system 16. Alternatively, the fluid and/or charge transfers can be done by a dual quick disconnect manifold with sensors and actuators similar in operation to the umbilical arrangement. During a rotational step of the conveyor system 16, one quick disconnect is maintained while the other is released. This method eliminates the need for a service transfer hose and cable that would need to circulate around with the conveyor system 16.

Another method of refueling and recharging the exchangeable tanks and cells is for the facility to contain a storage rack system (or bay area) either internally within or adjacent to the facility. The robotic service module 12 or robotic arm 71 would be controlled by electrical control signals communicated from the electronic computer control system 13, and would maneuver on rail systems as previously described herein. The computer control system 13 would receive charge level signals and types from sensors situated within the bay areas. Keeping track of charge levels enables the computer control system 13 to select a cell that meats a charge requirement of the user. Such a system is more flexible in allowing the user to select cells. In using a conveyor system, if a user did not want to select a particular type full tank/charge, the unit conveyor could be rotated to position a more recently removed tank/cell partially filled or charged, or preferentially desired type, for installation.

In general, there are two ways in which an ASSF can obtain required fuels or battery charges. They can be externally transferred to storage tanks and cells within the facilities for later transfer to the vehicle tanks and cells. Alternatively or in combination, the facilities contain on-board fuel and charge generators. For hydrogen generation, an electrolysis hydrogen generator (i.e., an electrolyzer system) is used that takes in facility water and electric power. The by-products are oxygen and heat, both of which are non-polluting exhaust. For gaseous or solid hydrogen retention tank recharging (as in metal hydrides), a high-pressure pump and buffer tanks are also employed. For liquid hydrogen, a chiller, insulated tanks, and a refrigerating system are used to liquefy the hydrogen and store it at low temperatures. Other types of source fuels can be used to generate hydrogen, such as methane or propane. For battery charging, battery charges are contained within the unit, and can receive electrical energy from local power utilities through an electric power cable. Alternatively, voltaic solar arrays may be attached to the ASSF to capture solar energy and convert it into electricity for use by the battery charger.

Currently, there are many off-the-shelf battery chargers, solar arrays, and fuel generators commercially available. Any quantity or combination of such devices may optionally be included within the ASSFs to generate the fuels and charges needed or required to service vehicle demand.

In summary, the ASSFs generally act as universal fuel generators and storage facilities, and also generally provide a universal interface for various vehicle input needs, including inputs such as gasoline, diesel, hydrogen, natural gas, electricity, or others. The ASSFs are generally equipped with universal adapters as needed to output the fuels and charges using connectors for interfacing with vehicles operable by any given fuel source. Additionally, the ASSFs also perform an autonomous or automatic exchange of fuel tanks, cells or packs of any type, thereby simplifying, expediting, and making easier the energy input-output interface or transfer. The structure and function of the ASSFs are to provide an energy delivery system that interfaces universally with these inputs, outputs, and also meets user needs. Such is why the ASSFs proposed herein are so useful. In particular, simply replacing a battery with a fully re-charged one generally eliminates any significant time period for waiting while a vehicle is serviced. That is, if the vehicles are properly constructed with replaceable tanks, cells, or batteries, and the machinery for performing the exchange is sufficiently robust, then such swapping can be accomplished with any type of tank, cell, or battery in a matter of seconds.

While the present invention has been described in what are presently considered to be its most practical and preferred embodiments or implementations, it is to be understood that the invention is not to be limited to the particular embodiments disclosed hereinabove. On the contrary, the present invention is intended to cover various modifications and equivalent arrangements included within the spirit and scope of the claims appended hereinbelow, which scope is to be accorded the broadest interpretation so as to encompass all such modifications and equivalent structures as are permitted under the law.

The invention claimed is:

1. An Automatic Service Station Facility (ASSF) for replenishing energy sources onboard different types of UAV, Drones, Vessel, Submersibles, and Remotely Controlled (RC) or robotic vehicles, said service station facility comprising:
   a rack;
   a plurality of replaceable fuel tanks stocked on said rack and substantially filled with various fluids utile as motivational energy sources within fuel-operated vehicles;
   a service module mounted on said rack;
   an avionics compartment containing at least a communication system;
   wherein said communication system is controllably operable to receive control commands from remote controllers, control vehicles, personnel, or centers, to perform various service operations, and also to transmit situational and identification information in return; and
   an electronic computer control system connected in electrical communication with said service module;
   wherein said service module is controllably operable to receive a depleted replaceable fuel tank from a fuel-operated vehicle and also selectively deliver one of said filled replaceable fuel tanks onboard said fuel-operated vehicle.

2. An automatic service station facility according to claim 1, wherein said service station facility further comprises:
   a hitch mounted on said rack; and
   a plurality of wheels rotatably mounted at the bottom of said rack;
   wherein both said hitch and said wheels facilitate towing of said service station facility.

3. An automatic service station facility according to claim 1, wherein said various fluids utile as motivational energy sources include at least one fluid selected from the group consisting of biodiesel, bioethanol, biomethane, butanol, compressed air, compressed hydrogen, compressed natural gas, diesel, ethanol, gasoline, hydride, hydrogen, hythane, liquefied natural gas, liquid hydrogen, liquid nitrogen, methane, methanol, oxygen, P-series fuel, propane, vegetable oil, and a fuel blend.

4. An automatic service station facility according to claim 1, wherein said service station facility further comprises:
   a conveyor system mounted on said rack and connected in electrical communication with said electronic computer control system;
   wherein said conveyor system is controllably operable to circulate said replaceable fuel tanks about said service station facility so that said service module has selective access to each of said replaceable fuel tanks.

5. An automatic service station facility according to claim 1, wherein said service station facility further comprises:
   an electrolyzer system connected in electrical communication with said electronic computer control system and controllably connectable in fluidal communication with any of said replaceable fuel tanks that are designated for retaining hydrogen;
   wherein said electrolyzer system is controllably operable to receive both water and electricity to thereby produce hydrogen so as to substantially fill any of said replaceable fuel tanks designated for retaining hydrogen.

6. An automatic service station facility according to claim 1, wherein said service station facility further comprises:
   a plurality of replaceable batteries stocked on said rack and substantially charged with electric charges utile as motivational energy sources within battery-operated vehicles;
   wherein said service module is controllably operable to receive a discharged replaceable battery from a battery-operated vehicle and also selectively deliver one of said charged replaceable batteries onboard said battery-operated vehicle.

7. An automatic service station facility according to claim 6, wherein said replaceable batteries stocked on said rack include at least one battery selected from the group consisting of a lead-acid type battery, a lithium-ion type battery, a nickel-cadmium type battery, a nickel/metal-hydride type battery, and a silver-zinc type battery.

8. An automatic service station facility according to claim 6, wherein said service station facility further comprises:
   a conveyor system mounted on said rack and connected in electrical communication with said electronic computer control system;
   wherein said conveyor system is controllably operable to circulate said replaceable batteries about said service station facility so that said service module has selective access to each of said replaceable batteries.

9. An automatic service station facility according to claim 6, wherein said service station facility further comprises:
   an electric charging system connected in electrical communication with said electronic computer control system and controllably connectable in electrical communication with any of said replaceable batteries that are designated for charging;
   wherein said electric charging system is controllably operable to substantially charge any of said replaceable batteries designated for charging.

10. An automatic service station facility according to claim 1, wherein said service station facility further comprises:
    at least one position sensor mounted on said rack and connected in electrical communication with said electronic computer control system;
    wherein each said position sensor is controllably operable to sense the position of a vehicle relative to said service station facility so as to facilitate alignment and controlled operation of said service module relative to said vehicle while said vehicle is serviced.

11. An automatic service station facility according to claim 1, wherein said service station facility further comprises:
    a transceiver mounted on said rack and connected in electrical communication with said electronic computer control system;
    wherein said transceiver is controllably operable to establish communication with a vehicle and thereby identify said vehicle so as to accordingly service said vehicle with said service module.

12. An automatic service station facility according to claim 1, wherein said service station facility further comprises:
    a service receiver or control panel connected in electrical communication with said electronic computer control system;
    a service transmitter or display monitor connected in electrical communication with said electronic computer control system;
    wherein both said service receiver/control panel and said service transmitter/display monitor facilitate controlled operation of said service station facility by remote operators with an established communication link between the service station facility and remote control facilities, vehicles, or devices.

13. An automatic service station facility according to claim 1, wherein said service station facility further comprises:
    a self-service receiver or control panel connected in electrical communication with said electronic computer control system;
    a self-service transmitter or display monitor connected in electrical communication with said electronic computer control system;
    wherein both said self-service receiver/control panel and said self-service transmitter/display monitor facilitate controlled operation of said service station facility by operators of said vehicles using an established communication link between the service station facility and the vehicle.

14. An automatic service station facility according to claim 6, wherein said service station facility further comprises:
    an electrical heating system;
    a fluidic heating and cooling system;
    wherein said electrical and fluidic heating and cooling systems may be connected in electrical communication with said electronic computer control system and controllably operable to pre-heat or cool stored fluid onboard the service station facility;

wherein said pre-heated or cooled fluid is circulated to stocked replaceable energy cells or batteries to thermally condition them, or keep them conditioned, for receiving electrical charge, or energy source of any kind, and keep them thermally conditioned for operation service;

wherein alternatively, the electric heating system may be used to heat the stocked replaceable energy cells or batteries directly.

15. An automatic service station facility for replenishing energy sources onboard different types of vehicles, said service station facility comprising:
a rack;
a plurality of fuel storage tanks mounted on said rack and adapted to retain various fluids utile as motivational energy sources within fuel-operated vehicles;
a fluid pumping system mounted on said rack and connected in fluidal communication with said fuel storage tanks;
a service module mounted on said rack and connected in fluidal communication with said fuel storage tanks; and
an electronic computer control system connected in electrical communication with said fluid pumping system and said service module;
wherein said service module is controllably operable to establish fluidal communication with a fuel-operated vehicle and also selectively deliver one of said various fluids into a depleted fuel tank onboard said fuel-operated vehicle.

16. An automatic service station facility according to claim 15, wherein said various fluids utile as motivational energy sources include at least one fluid selected from the group consisting of biodiesel, bioethanol, biomethane, butanol, compressed air, compressed hydrogen, compressed natural gas, diesel, ethanol, gasoline, hydride, hydrogen, hythane, liquefied natural gas, liquid hydrogen, liquid nitrogen, methane, methanol, oxygen, P-series fuel, propane, vegetable oil, and a fuel blend.

17. An automatic service station facility according to claim 15, wherein said service station facility further comprises:
an electrolyzer system connected in electrical communication with said electronic computer control system and connected in fluidal communication with any of said fuel storage tanks that are designated for retaining hydrogen;
wherein said electrolyzer system is controllably operable to receive both water and electricity to thereby produce hydrogen so as to substantially fill any of said fuel storage tanks designated for retaining hydrogen.

18. An automatic service station facility according to claim 15, wherein said service station facility further comprises:
an electric charging system connected in electrical communication with both said electronic computer control system and said service module;
wherein said service module is controllably operable to establish electrical communication with a battery-operated vehicle and also substantially charge a discharged battery onboard said battery-operated vehicle.

19. An automatic service station facility according to claim 15, wherein said service station facility further comprises:
an electrical heating system;
a fluidic heating and cooling system;

wherein said electrical and fluidic heating and cooling systems may be connected in electrical communication with said electronic computer control system and controllably operable to pre-heat or cool stored fluid onboard the service station facility;

wherein said pre-heated or cooled fluid is circulated to energy cells or batteries onboard vehicles using said service module, to thermally condition them, or keep them conditioned, for receiving electrical charge, or energy source of any kind, and keep them thermally conditioned for operation service;

wherein alternatively, the electric heating system may be used to heat the energy cells or batteries onboard vehicles using said service module, to thermally condition them, or keep them conditioned, for receiving electrical charge, or energy source of any kind, and keep them thermally conditioned for operation service.

20. An automatic service station facility for replenishing energy sources onboard different types of vehicles, said service station structure comprising:
a rack;
a plurality of replaceable fuel tanks stocked on said rack and substantially filled with various fluids utile as motivational energy sources within fuel-operated vehicles;
a plurality of fuel storage tanks mounted on said rack and adapted to retain various fluids utile as motivational energy sources within fuel-operated vehicles;
a fluid pumping system mounted on said rack and connected in fluidal communication with said fuel storage tanks;
a service module mounted on said rack and connected in fluidal communication with said fuel storage tanks; and
an electronic computer control system connected in electrical communication with said fluid pumping system and said service module;
wherein said service module is controllably operable to receive a depleted replaceable fuel tank from a fuel-operated vehicle and also selectively deliver one of said filled replaceable fuel tanks onboard said fuel-operated vehicle; and
wherein said service module is controllably operable to establish fluidal communication with a fuel-operated automotive vehicle and also selectively deliver one of said various fluids into a depleted fuel tank onboard said fuel-operated vehicle.

21. An automatic service station facility according to claim 20, wherein said service station facility further comprises:
a plurality of replaceable batteries stocked on said rack and substantially charged with electric charges utile as motivational energy sources within battery-operated vehicles;
an electric charging system connected in electrical communication with both said electronic computer control system and said service module and controllably connectable in electrical communication with any of said replaceable batteries that are designated for charging;
wherein said service module is controllably operable to receive a discharged replaceable battery from a battery-operated vehicle and also selectively deliver one of said charged replaceable batteries onboard said battery-operated vehicle;
wherein said electric charging system is controllably operable to substantially charge any of said replaceable batteries designated for charging; and wherein said service module is controllably operable to establish electrical communication with a battery-operated vehicle and also substantially charge a discharged battery onboard said battery-operated vehicle.

22. An automatic service station facility according to claim 1, wherein said service station facility further comprises:
   a propulsion system;
   wherein said propulsion system facilitates self-propelled mobility of said service station facility.

23. An automatic service station facility according to claim 22, wherein said propulsion system includes at least one propulsion system selected from the group consisting of internal combustion engine (ICE), turbine engine, or electric motors.

24. An automatic service station facility according to claim 22, wherein said service station facility further comprises:
   an electric propulsion system;
   a solar power generating system; and
   a battery pack;
   wherein said propulsion system, solar power generating system, and battery pack facilitate continuous self-propelled mobility of said service station facility, where the solar power generating system is used to recharge the battery pack used to power the propulsion.

25. An automatic service station facility according to claim 24, wherein said solar power generating system is controllably operable to facilitates the recharging (per claim 9) of the onboard stock of replicable batteries (per claim 6);
   wherein said solar power generating system is controllably operable to facilitates the recharging of batteries onboard battery operated RC or robotic vehicles (per claim 17).

26. An automatic service station facility according to claim 24, wherein said solar power generating system further comprises:
   photovoltaic cells, or solar arrays, for collecting and transforming solar energy to electric energy, which may be deployable, expand, extend, or inflate, to create larger surface areas for collecting more solar energy.

27. An automatic service station facility according to claim 24, wherein said solar power generating system further comprises:
   independently, or in combination with photovoltaic cells or solar arrays (per claim 26), rectifying antennas for collecting and transforming Radio Frequency (RF) energy to electrical energy, which may be deployable, expand, extend, or inflate, to create larger surface areas for collecting more energy, particularly during dark, no sun, conditions.

28. An Automatic Service Station Facility according to claim 24, wherein said solar power generating system further comprises:
   a power converter and battery charger for transforming collected energy to different voltage levels to facilitate operations of said Automatic Service Station Facility and charging of onboard batteries, polarity of replaceable batteries, or batteries onboard battery-operated vehicles being serviced.

29. An automatic service station facility according to claim 22, wherein said service station facility further comprises:
   an avionics compartment, which may consist of components such as a Guidance, Navigation, and Control (GNC) system, an Inertial Navigation Unit (INU), a Global Positioning System (GPS), and a communications system;
   an observation/navigation platform, which may consist of components such as a video camera, radar, and Light Detection And Ranging (LIDAR) device;
   wherein said components of said avionics compartment and observation/navigation platform operate together to facilitate remote control, or autonomous control, of said propulsion system, for the purpose of navigating the automatic service station facility to different locations, and for performing various maneuver operations and service task as required by the various missions (for example, rotating and moving to level ground, and selecting an appropriate battery for delivery to a particular vehicle inbound for servicing).

30. An automatic service station facility according to claim 26, wherein said service station facility further comprises:
   an Automatic Rendezvous and Docking (AR&D) system;
   wherein said AR&D system facilitates in guiding a RC or robotic vehicle to the automatic service station facility for engagement with the service module;
   wherein said AR&D system may be comprised of said components of the avionics compartment and observation/navigation platform, including the GNC system, Radar, LIDAR, video camera, and communication system.

* * * * *